(12) United States Patent
Kuczenski

(10) Patent No.: US 11,035,085 B2
(45) Date of Patent: Jun. 15, 2021

(54) MOUNTING CLAMP FOR LINE STRIPER SPRAYER

(71) Applicant: Graco Minnesota Inc., Minneapolis, MN (US)

(72) Inventor: Steven R. Kuczenski, New Brighton, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 16/774,398

(22) Filed: Jan. 28, 2020

(65) Prior Publication Data

US 2020/0181858 A1    Jun. 11, 2020

Related U.S. Application Data

(63) Continuation of application No. 15/411,434, filed on Jan. 20, 2017, now Pat. No. 10,584,452.

(60) Provisional application No. 62/280,766, filed on Jan. 20, 2016.

(51) Int. Cl.
| | | |
|---|---|---|
| E01C 23/00 | (2006.01) | |
| E01C 23/22 | (2006.01) | |
| A63C 19/06 | (2006.01) | |
| F16B 7/04 | (2006.01) | |
| F16B 2/06 | (2006.01) | |
| F16M 13/02 | (2006.01) | |

(52) U.S. Cl.
CPC ............ *E01C 23/22* (2013.01); *A63C 19/065* (2013.01); *F16B 2/065* (2013.01); *F16B 7/0493* (2013.01); *F16M 13/02* (2013.01); *A63C 2019/067* (2013.01); *A63C 2203/12* (2013.01); *A63C 2203/24* (2013.01)

(58) Field of Classification Search
CPC . E01C 23/22; A63C 19/065; A63C 2019/067; A63C 2203/12; A63C 2203/24; F16M 13/02; F16B 2/065; F16B 7/0493
USPC .............................................. 404/72, 75, 94
See application file for complete search history.

(56) References Cited

U.S. PATENT DOCUMENTS

| | | | |
|---|---|---|---|
| 2,420,002 | A | 5/1947 | Mckay |
| 2,695,812 | A | 11/1954 | Harz |
| 2,756,879 | A | 7/1956 | Kent |
| 3,158,324 | A | 11/1964 | Oehler et al. |

(Continued)

FOREIGN PATENT DOCUMENTS

| | | |
|---|---|---|
| CN | 1874923 A | 12/2006 |
| CN | 201605521 U | 10/2010 |
| EP | 2784368 A1 | 10/2014 |

OTHER PUBLICATIONS

Extended European Search Report for EP Application No. 17152487.9, dated May 24, 2017, pp. 9.

(Continued)

*Primary Examiner* — Raymond W Addie
(74) *Attorney, Agent, or Firm* — Kinney & Lange, P.A.

(57) ABSTRACT

A method of mounting at least one spray gun assembly onto an arm of a line striper includes installing a first clamp onto the arm with the first clamp being connected to a first spray gun assembly and the first clamp having an opening. The first clamp is installed onto the arm by placing the arm within the opening of the first clamp without sliding the first clamp onto an end of the arm. The method also includes securing the arm of the line striper within the opening of the first clamp.

20 Claims, 5 Drawing Sheets

(56) References Cited

U.S. PATENT DOCUMENTS

| | | | |
|---|---|---|---|
| 3,425,098 A | 2/1969 | Bredvik | |
| 3,902,931 A | 9/1975 | Danciger et al. | |
| 3,913,836 A | 10/1975 | Stevenson | |
| 4,267,973 A | 5/1981 | Stewart | |
| 4,363,475 A | 12/1982 | McCarty | |
| 4,624,602 A | 11/1986 | Kieffer et al. | |
| 4,666,116 A | 5/1987 | Lloyd | |
| 4,702,448 A | 10/1987 | LoJacono et al. | |
| 4,828,177 A | 5/1989 | Schitemaker | |
| 4,877,348 A | 10/1989 | Opie | |
| 5,213,480 A * | 5/1993 | Yedinak | E01C 23/20 417/234 |
| 5,263,789 A * | 11/1993 | Torntore | E01C 23/22 404/93 |
| 5,302,207 A * | 4/1994 | Jurcisin | E01C 23/22 118/207 |
| 5,312,079 A | 5/1994 | Little, Jr. | |
| 5,485,960 A | 1/1996 | Troudt | |
| 5,733,061 A | 3/1998 | Child | |
| D457,410 S | 5/2002 | Von Fange | |
| 6,478,242 B1 | 11/2002 | Knobbe et al. | |
| 7,520,478 B2 | 4/2009 | Whitfield | |
| 7,654,771 B2 * | 2/2010 | Schroeder | E01C 23/22 404/94 |
| 2006/0278785 A1 | 12/2006 | Wiesner et al. | |
| 2010/0072717 A1 * | 3/2010 | Liska | E01C 23/22 280/47.371 |
| 2014/0103138 A1 | 4/2014 | Hobbs et al. | |
| 2015/0136020 A1 | 5/2015 | Lins et al. | |
| 2015/0297826 A1 | 10/2015 | Slaker et al. | |

OTHER PUBLICATIONS

First Chinese Office Action for CN Application No. 2017100428770, dated Oct. 24, 2018, pp. 15.
Second Chinese Office Action for CN Application No. 2017100428770, dated Jun. 11, 2019, pp. 12.
Extended European Search Report for EP Application No. 19150261.6, dated Mar. 6, 2019, pp. 9.
Communication Pursuant to Article 94(3) EPC for EP Application No. 19150261.6, dated Apr. 17, 2020, pp. 5.
Chinese Decision of Rejection for CN Application No. 2017100428770, dated Jan. 20, 2020, pp. 12.

* cited by examiner

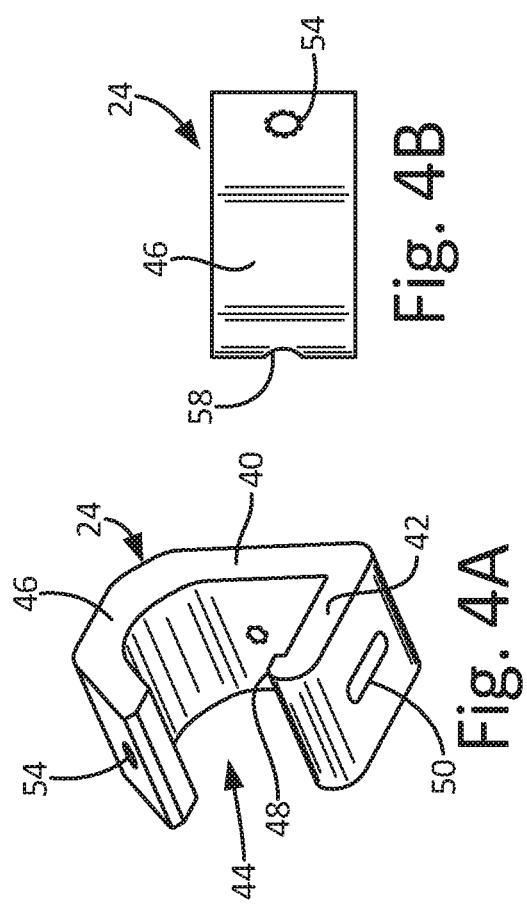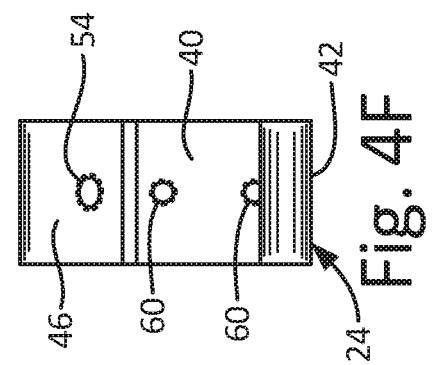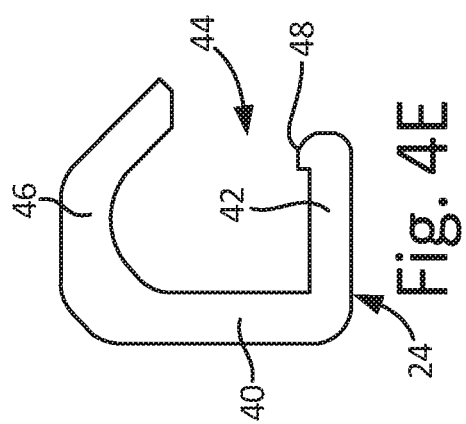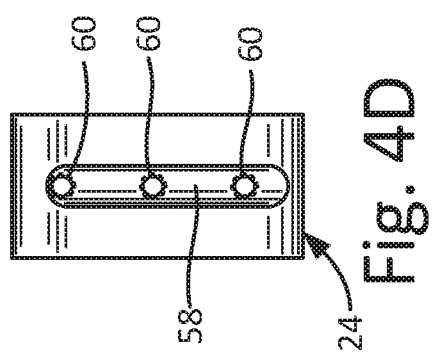

MOUNTING CLAMP FOR LINE STRIPER SPRAYER

CROSS-REFERENCE TO RELATED APPLICATION(S)

This application is a continuation of and claims the benefit of U.S. application Ser. No. 15/411,434 filed Jan. 20, 2017, for "MOUNTING CLAMP FOR LINE STRIPER SPRAYER" by S. R. Kuczenski, which in turn claims the benefit of U.S. Provisional Application No. 62/280,766 filed Jan. 20, 2016, for "MOUNTING CLAMP FOR LINE STRIPER SPRAYER" by S. R. Kuczenski, the disclosures of which are incorporated by reference in their entirety.

BACKGROUND

The present disclosure relates generally to line striping machines, such as those used for applying painted stripes to roadways and athletic fields, and more specifically to a clamp for fastening a spray gun assembly to a frame of the line striping machine.

Line striping machines, also referred to as line stripers, typically comprise carts that are pushed by a user and/or are gas or electrically propelled. Line stripers typically include an engine for driving a pump and/or generating electrical power. The pump is fed a liquid, such as paint, from a reservoir on the line striper and supplies pressurized fluid to spray nozzles on the cart to discharge liquid towards a desired surface.

SUMMARY

A line striper includes a frame, a mounting arm extending from the frame, a G-shaped clamp, a vertical bar, an extension bar, and a spray gun. The G-shaped clamp has an opening through which the mounting arm is able to extend and a fastener configured to secure the mounting arm within the opening. The opening allows the first clamp to be mounted and then secured on the mounting arm without relative sliding between the first clamp and the mounting arm. The vertical bar is attached to and extends from the clamp. The extension bar is attached to and extends from the vertical bar, and the spray gun is attachable to the extension bar.

A clamp for use with a line striper having a frame and a mounting arm that includes a first leg, a second leg, a third leg, and an opening formed by the legs. The first leg has an inner side, a first end, and a second end. The second leg extends away from the first leg and has an inner side that forms a corner with the inner side of the first leg, a first end that is connected to the first end of the first leg, and a second end distal from the first end of the second leg. A third leg extends away from the second end of the first leg and has a curved inner side, a first end that is connected to the second end of the first leg, and a second end distal from the first end of the third leg. The mounting arm of the line striper is able to extend through the opening, and a fastener is extendable from the third leg towards the corner formed by the first leg and the second leg with the fastener configured to secure the mounting arm in place relative to the clamp.

BRIEF DESCRIPTION OF THE DRAWINGS

FIG. 4A is a perspective view of a top side of the clamp.

FIG. 4B is a bottom plan view of the clamp.

FIG. 4C is a perspective view of a bottom side of the clamp.

FIG. 4D is a front elevation view of the clamp.

FIG. 4E is a side elevation view of the clamp.

FIG. 4F is a rear elevation view of the clamp.

DETAILED DESCRIPTION

Figure 1:
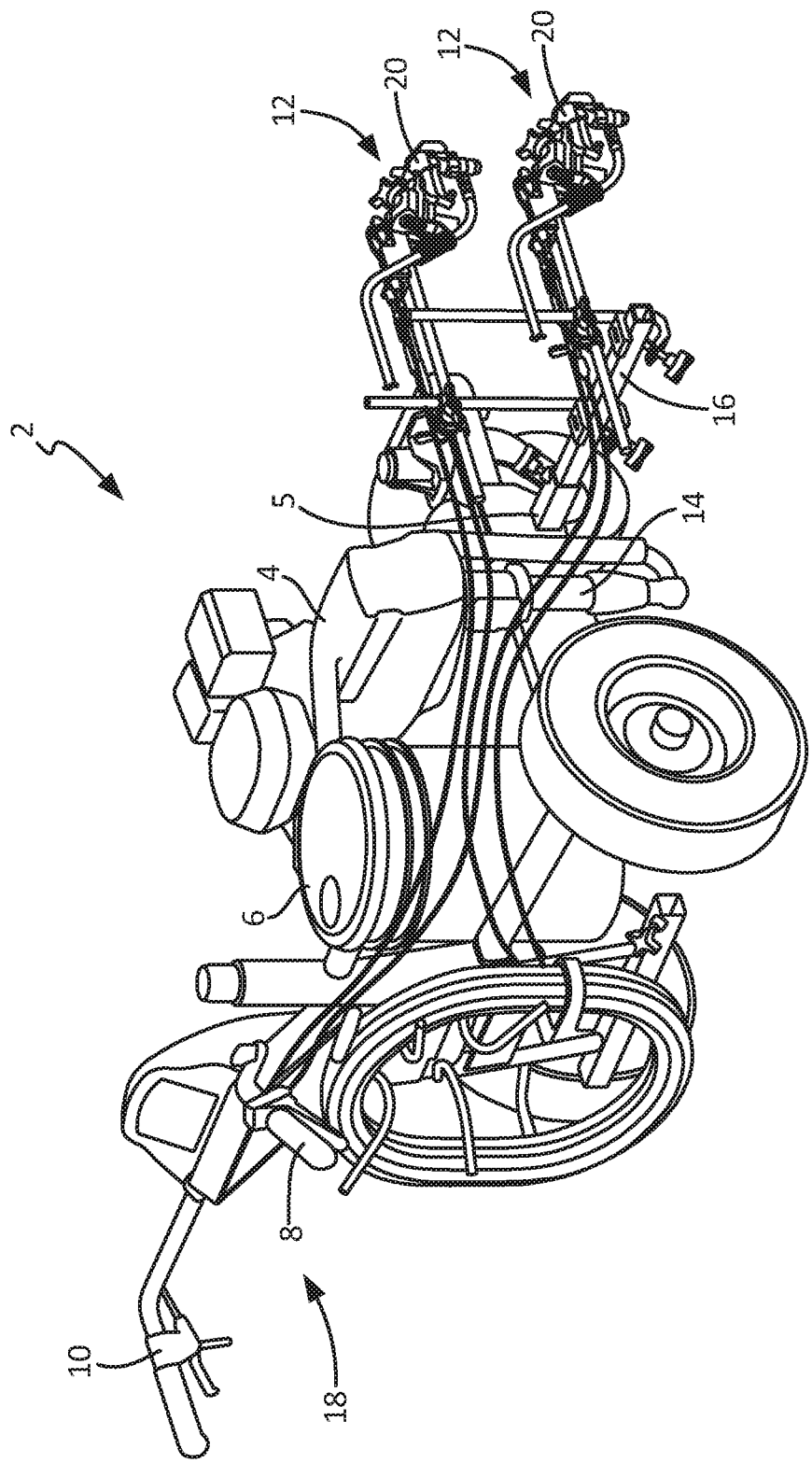
FIG. 1 is a perspective view of a line striper.

A clamp for use with a line striper is disclosed. The clamp is generally G shaped with an opening through which a mounting arm is able to extend and be secured relative to the clamp. The mounting arm is able to be removed from the opening of the clamp such that the clamp can be separated from the mounting arm. The clamp secures components of a spray gun assembly (such as a vertical bar, an extension bar, a spray gun, and a spray gun holder) to the mounting arm. The clamp includes a fastener configured to secure the mounting arm within the opening to secure the spray gun assembly to the mounting arm and therefore to a frame of the line striper. Because the clamp has a generally G-shaped profile, the clamp and the spray gun assembly can be installed onto and removed from the mounting arm without having to slide the clamp on and off an end of the mounting arm. With the line striper usually having multiple spray gun assemblies mounted along one mounting arm, the disclosed clamp does not require an outer spray gun assembly to be removed from the mounting arm before installing or removing the inner spray gun assembly from the mounting arm.

The clamp can be installed onto and removed from the mounting arm without the need to slide the clamp and spray gun assembly on and off the end of the mounting arm (or vice versa, as the clamp being installed onto and removed from the mounting arm is the same action as inserting into and removing the mounting arm from the opening within the clamp). Further, the curved shape of an inner curved side of the clamp aids in separating the mounting arm from the clamp because the curved inner side can guide the clamp off of the mounting arm (i.e., a corner of the mounting arm cannot get caught in a corner of an inner curved side of the clamp). The clamp can include a number of other advantageous features. The clamp can include a lip that extends into the opening to aid in securing the mounting arm from moving or rotating within the opening. The clamp can include a window through which the mounting arm is viewable so that measurement markings on the mounting arm can be viewed and used to orient and line up the spray gun assembly relative to the line striper and to other gun assemblies. The fastener can be a screw that extends through a leg of the clamp with the fastener having a handle on one end to tighten and loosen the fastener. The fastener can extend into the opening and towards the mounting arm at an angle that urges the mounting arm into the corner on the inner sides of the clamp such that only one fastener is needed to secure the clamp to the mounting arm along all degrees of freedom. The clamp can contain other features that attach the clamp to the other components of the spray gun assembly, such as the vertical bar, including a groove and/or an aperture along with screws to attach the vertical bar to a back side of the clamp.

While paint will be used herein as exemplar when discussing the line striper and spray gun assembly, it will be understood that this is merely one example and that other solutions (e.g., water, oil, solvents, beads, flowable solids, pellets, etc.) can be applied by the line striper and spray gun assembly instead of paint. Also, while the term "line striper" is used herein as an example, it will be understood that the scope of this disclosure includes dispensing fluid and/or material on any surface in any pattern and is not limited to the painting of stripes.

FIG. 1 is a perspective view of line striper 2, which includes engine 4, frame 5, reservoir 6, manual control 8, assisted control 10 (also referred to as an auto control), spray gun assemblies 12, pump 14, mounting arm 16, operator station 18, spray guns 20, and hose 21. Line striper 2 is a machine used for applying painted stripes and other painted designs to roadways and athletic fields. Line striper 2 can be propelled by an outside source, such as being pushed or pulled by a human operator or by a vehicle, and/or line striper 2 can be self-propelled by a gas engine, electric motor, or other drive means. Line striper 2 includes other components not specifically described in this disclosure.

Engine 4 can be a gas-operated internal combustion engine or another type of engine that provides power to the components of line striper 2. Engine 4 can charge one or more batteries (not shown), provide direct mechanical input to pump 14 via a system of belts, pulleys, and/or other mechanics (not shown), and/or propel line striper 2, among other functions. The size and output of engine 4 can be configured to suit the needs of line striper 2.

Frame 5 is the main structural support for the components of line striper 2. Attached to frame 5, among other components, are wheels, engine 4, reservoir 6, pump 14, mounting arm 16, and operator station 18. Frame 5 can be constructed from a variety of materials, including metal (such as aluminum), a metal alloy, a composite, or another material. Frame 5 can be made from one continuous and monolithic piece or can be a number of pieces fastened together through various means, including bolts, welds, or another type of fastener.

Reservoir 6 is a tank, such as a bucket, that contains paint or another suspension or solution that is to be applied to a surface by line striper 2 and spray guns 20. Reservoir 6 can be constructed from a variety of materials, including plastic, metal (such as aluminum), a metal alloy, a composite, or another material. Reservoir 6 can be detachable to allow for the addition of paint into or removal of paint from reservoir 6 at a location distant from line striper 2. Further, line striper 2 can include multiple reservoirs 6 with connections to each spray gun 20 so that different types of paint can be carried upon line striper 2 and applied by each spray gun 20.

Pump 14 pulls paint from reservoir 6 and, by action of a piston or another type of pump mechanism, pressurizes the paint and supplies the paint to spray guns 20 for application of the paint to the desired surface. Pump 14 is connected to hose 21, which conveys paint from reservoir 6 to spray guns 20. Line striper 2 can include multiple pumps 14 to pressurize and supply paint to multiple spray guns 20, or one pump 14 can be configured to supply paint to multiple spray guns 20.

Operator station 18 is a station on line striper 2 where the user sits or stands and from which the user controls the operation of line striper 2, including the activation of spray guns 20. Operator station 18 can include handles, electronic components (such as a computer processor and display screen), engine controls, speed and directional controls, and other components that allow the user to operate line striper 2. The components of operator station 18 can be attached to one another and/or frame 5 through various fasteners and can have a configuration and/or orientation that allows for line striper 2 to be user friendly, durable, and easily manufactured and maintained.

Manual control 8 can be located near a handle of operator station 18 and allows the user to manually control the application of paint by each of the spray guns 20. Manual control 8 can be a lever that pivots to allow the user to turn the spray gun on and off and adjust the amount of paint being applied by each spray gun 20. Manual control 8 can generate tension on a cable that runs from the lever on the handle of operator station 18 to one or more gun assemblies 20 to remotely pull a trigger on spray gun 20 to activate spray gun 20. For multiple spray guns 20, manual control 8 can include multiple levers and multiple cables to control the application of paint by each spray gun 20.

Assisted control 10 (also referred to as an auto control) can be located near another handle of operator station 18 and allows a controller, such as an electronic component/computer processor, to control the application of paint by each of the spray guns 20. The controller can include preprogramed paint spray patterns that the user can select so that line striper 2 applies paint without the need for the user to use manual control 8. Assisted control 10 can be a button or another input which is operatively connected to the controller and/or another component (such as a solenoid) that generates tension on a cable to remotely pull a trigger on spray gun 20 to activate spray gun 20. For multiple spray guns 20, assisted control 10 can include multiple buttons to communicate with controller and multiple cables to control the application of paint by each spray gun 20.

Mounting arm 16 is a support member that is attached to and extends laterally away from frame 5 near a front of line striper 2. Mounting arm 16 provides a structural support to which multiple gun assemblies 12 can attach. In some embodiments, mounting arm 16 is extendable and retractable from frame 5 of line striper 2 to adjust the location of mounting arm 16 relative to frame 5. Mounting arm 16 can have a variety of shapes, configurations, and orientations, but mounting arm 16 as shown in FIG. 1 is a hollow, elongated bar that has a square cross section. An end of mounting arm 16 can be configured to insert into a casing of frame 5 to hold mounting arm 16 in place relative to frame 5.

Gun assembly 12 holds one or more spray guns 20 and attaches spray gun 20 to mounting arm 16. Line striper 2 can include multiple gun assemblies 12, and multiple gun assemblies 12 can be attached to one mounting arm 16. As will be described in greater detail with regards to FIG. 2, gun assembly 12 is adjustable to slide along mounting arm 16, move spray gun 20 up or down, and move spray gun 20 forward or rearward. Thus, gun assembly 12 is able to adjust the location of spray gun 20 in any direction. Gun assembly 12 is able to be removed from mounting arm 16 to completely disconnect from line striper 2. While the disclosed embodiment shows two gun assemblies 12, line striper 2 can include one or more than two gun assemblies 12. Gun assembly 12 includes a number of components that will be described in greater detail with regards to FIG. 2.

Spray gun 20 is a component of gun assembly 12 and is located at the front of line striper 2. Spray gun 20 is supplied paint from reservoir 6 through the use of pump 14 and hose 21 and applies the paint to a desired surface. Spray gun 20 is able to be secured relative to frame 5 and the other components of line striper 2 such that movement of line striper 2 controls the movement of spray gun 20. Spray gun 20 can include a trigger that activates spray gun 20. The trigger is able to be pulled by manual control 8, assisted control 10, and directly by the user. Spray gun 20 is also able to be removed from gun assembly 12 to allow a user to apply paint to a surface that is distant from line striper 2 during generally stationary work (while still allowing spray gun 20 to be attached to hose 21 and supplied paint from reservoir 6), such as for stenciling a design or applying paint in another manner. The disclosed embodiment shows one spray gun 20 corresponding to one gun assembly 12, but gun assemblies 12 and spray guns 20 can be configured such that two or more spray guns 20 are attachable to one gun assembly 12. Each spray gun 20 can be operated independently from one another. Further, line striper 2 can include multiple hoses 21 to convey paint to multiple spray guns 20. As mentioned above, gun assembly 12 is adjustable to adjust the location of spray gun 20 relative to frame 5 and mounting arm 16.

Figure 2:
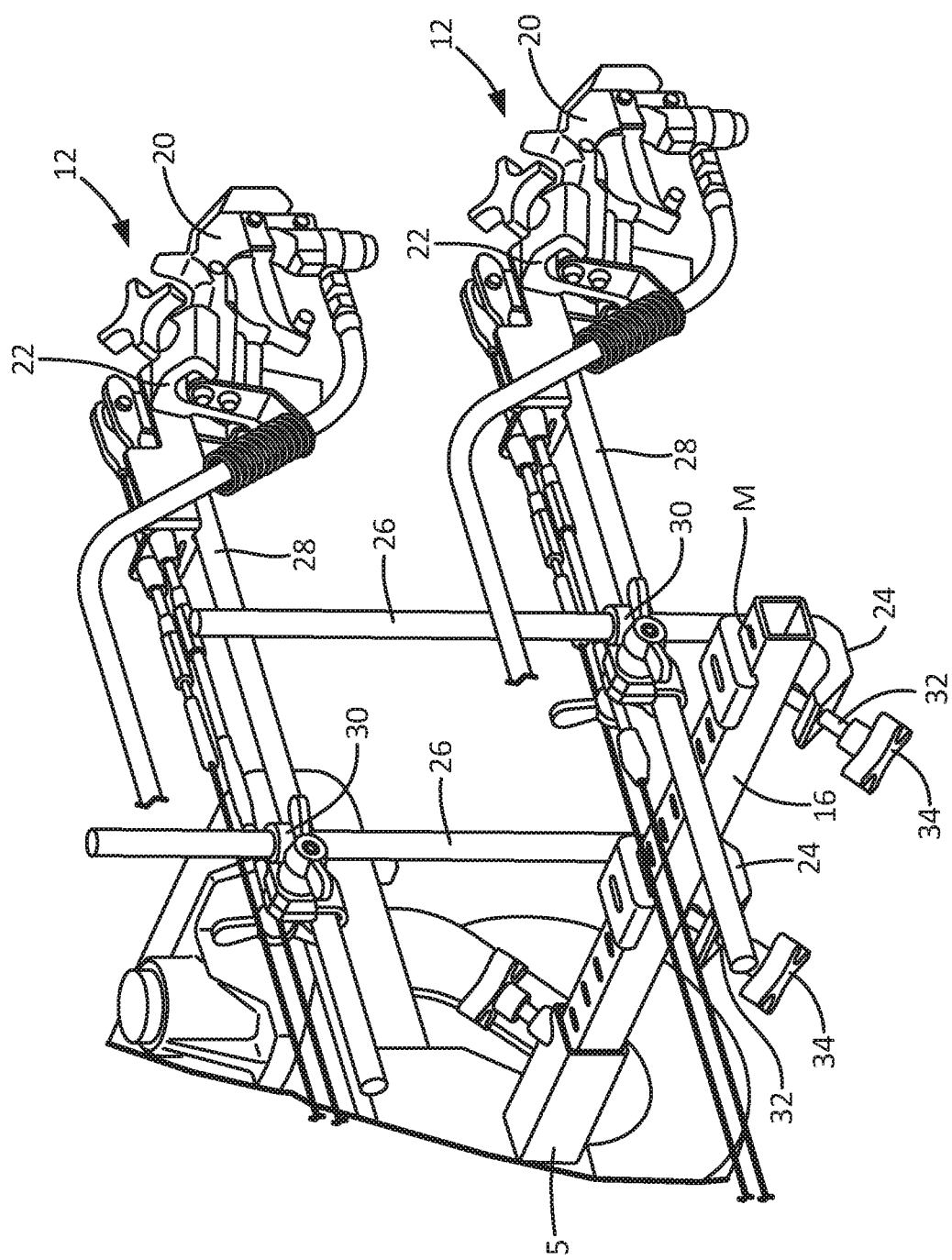
FIG. 2 is a perspective view of two spray gun assemblies mounted on a mounting arm.

FIG. 2 is a perspective view of two gun assemblies 12 mounted on mounting arm 16. FIG. 2 shows mounting arm 16 (with measurement markings M) connected to frame 5. FIG. 2 also shows two gun assemblies 12 that each includes spray gun 20, gun holder 22, clamp 24, vertical bar 26, extension bar 28, and connector 30. Clamp 24 includes fastener 32 with handle 34.

Mounting arm 16 is attached to frame 5 and fits into a hollow casing of frame 5 that secure mounting arm 16 from movement relative to frame 5 of line striper 2. Mounting arm 16 has a square cross-sectional shape and is hollow, but other designs of mounting arm 16 can have another shape, configuration, and orientation. Along a top of mounting arm 16 are measurement markings M, which indicate distance along mounting arm 16 to aid in placing gun assemblies 12 along mounting arm 16 relative to other gun assemblies 12 and to frame 5. Measurement markings M can show any units of measurement, including SI units (centimeters) and English units (inches), and measurement markings M can be imprinted or etched onto mounting arm 16 or can be painted or otherwise applied using another material different in substance and/or color than that of mounting arm 16.

Clamp 24 attaches gun assembly 12 to mounting arm 16. As shown in FIG. 2, multiple clamps 24 can be attached to mounting arm 16. As will be described in greater detail with regards to FIGS. 3A-B and 4A-4F, clamp 24 has a generally G-shaped profile with an opening through which mounting arm 16 can extend. The G-shaped profile of clamp 24 allows clamp 24 and gun assembly 12 to be installed upon and removed from mounting arm 16 without having to slide clamp 24 and gun assembly 12 on or off of an end of mounting arm 16 (and without having to remove other gun assemblies 12 from mounting arm 16). In FIG. 2, the opening of clamp 24 faces rearward such that clamp 24 would move forward to be removed from mounting arm 16. However, other configurations of clamp 24 can include clamp 24 with an opening that faces forward. Clamp 24 includes fastener 32 with handle 34 that is able to tighten to secure mounting arm 16 to clamp 24 and able to loosen to allow clamp 24 and gun assembly 12 to slide along mounting arm 16 and/or be removed from mounting arm 16. As shown in FIG. 2, fastener 32 extends into the opening of clamp 24 at an angle upward and forward to contact mounting arm 16 to keep mounting arm 16 adjacent to two inner sides of clamp 24, thereby limiting all degrees of freedom of clamp 24 relative to mounting arm 16. Fastener 32 can have other configurations and orientations, such as a fastener that includes a spring loaded mechanism that snaps into place to secure clamp 24 adjacent to mounting arm 16 or a fastener that extends into the opening at a different angle relative to clamp 24.

Vertical bar 26 is a shaft that is attached to clamp 24 at one end and extends upward/vertical relative to mounting arm 16. The disclosed embodiment shows vertical bar 26 extending generally vertical, but vertical bar 26 can extend away from clamp 24 and mounting bar 16 at another angle. Vertical bar 26 can be constructed from a variety of materials, such as plastic, metal (such as aluminum), a metal alloy, a composite, or another material. While vertical bar 26 is shown to be a straight shaft having a circular cross-sectional shape, vertical bar 26 can be curved or wavy and can have a variety of cross-sectional shapes. However, vertical bar 26 should be configured to allow connector 30 (which connects extension bar 28 to vertical bar 26) to slide along vertical bar 26. Vertical bar 26 can also include a stopper at another end (the end distant from the end that is attached to clamp 24) to prevent connector 30 from sliding off of vertical bar 26.

Extension bar 28 is a shaft that is attached to vertical bar 26 by connector 30 and extends forward towards a front of gun assembly 12. The disclosed embodiment shows extension bar 28 extending generally horizontal relative to mounting bar 16 and vertical bar 26, but extension bar 28 can extend at another angle, such as an angle that is partially upwards or downwards. Extension bar 28 can be constructed from a variety of materials, such as plastic, metal (such as aluminum), a metal alloy, a composite, or another material. While extension bar 28 is shown to be a straight shaft having a circular cross-sectional shape (similar to vertical bar 26), extension bar 28 can be curved or wavy and can have a variety of cross-sectional shapes. However, extension bar 28 should be configured so as to not interfere with hoses 21 and the cables of manual control 8 and assisted control 10, and extension bar 28 should be configured to allow connector 30 to slide along extension bar 28.

Connector 30 connects vertical bar 26 to extension bar 28 and allows adjustment of extension bar 28 relative to mounting arm 16 and clamp 24. Connector 30 includes one vertical orifice with a corresponding fastener and handle through which vertical bar 26 can extend, slide within, and be secured so as to be prevented from movement relative to clamp 24. This functionality of connector 30 and vertical bar 26 allows the vertical adjustment of spray gun 20 relative to mounting arm 16. For example, as shown in FIG. 2, extension bar 28 can be higher or lower on vertical bar 26 so that spray guns 20 at the ends of corresponding gun assemblies 12 can be at different heights above the surface to be painted (i.e., spray gun 20 in the foreground is lower than spray gun 20 in the background). Connector 30 also includes a horizontal orifice with a corresponding fastener and handle through which extension bar 28 can extend, slide within, and be secured so as to be prevented from movement relative to vertical bar 26. This functionality of connector 30 and extension bar 28 allows the forward-rearward adjustment of spray gun 20 relative to mounting arm 16. For example, so shown in FIG. 2, extension bar 28 can be forward or rearward on vertical bar 26 so that spray guns 20 at the ends of corresponding gun assemblies 12 can be at different forward-rearward locations relative to mounting arm 16 (i.e., spray gun 20 in the foreground is rearward of spray gun 20 in the background). Thus, connector 30 allows for the up-down (i.e., vertical) and forward-rearward adjustment of spray gun 20 while also tightening to secure vertical bar 26 and extension bar 28 in place relative to clamp 24.

Gun holder 22 is attached to extension bar 28 and is configured to allow spray gun 20 to attach to and detach from gun assembly 12. Gun holder 22 can be attached to extension bar 28 by a variety of means, including welding, bolts, screws, or other fasteners. Gun holder 22 can include a rail into which a portion of spray gun 20 slides, or gun holder 22 can include another type of fastener that allows attachment and detachment of spray gun 20. Spray gun 20 can be secured in gun holder 22 for spraying while line striper 2 is in motion (e.g., spraying stripes) but is removable for generally stationary work (e.g., stenciling). While the disclosed embodiment shows gun assembly 12 having gun holder 22, other embodiments can include a configuration in which gun holder 22 is not present and spray gun 20 is attachable directly to extension bar 28.

Spray gun 20 is located at the forward end of gun assembly 12 and applies paint to a desired surface. Spray gun 20 is attachable to gun holder 22 such that spray gun 20 can be activated by manual control 8 and assisted control 10 remotely from spray gun 20 (through a trigger on spray gun 20 or other means) to control the application of paint. The control of spray gun 20 can be from a distance, such as from operation station 18 of line striper 2. Moreover, spray gun 20 is detachable from gun holder 22 and gun assembly 12 such that spray gun 20 can be used to apply paint distant from line striper 2 (through the manipulation of the trigger on spray gun 20 by a user). The detachment of spray gun 20 to apply paint distant from line striper 2 may be useful when stenciling a design or applying paint in another, non-striping manner.

With mounting arm 16 able to be adjusted relative to frame 5, clamp 24 able to slide gun assembly 12 laterally along mounting arm 16, connector 30 able to extension bar 28 vertically along vertical bar 26, and connector 30 able to slide vertical bar 26 forward-rearward along extension bar 28, spray gun 20 is adjustable in every direction relative to frame 5 of line striper 2. This adjustment capability allows a wide range of positions multiple spray guns 20 can be placed relative to one another to provide a large variety of patterns of line striping by line striper 2. Further, clamp 24 allows for each gun assembly 12 to be removed from mounting arm 16 independently and without having to remove other gun assemblies 12. The configuration and orientation of clamp 24 is described in greater detail with regards to FIGS. 3A-3B.

Figure 3A:
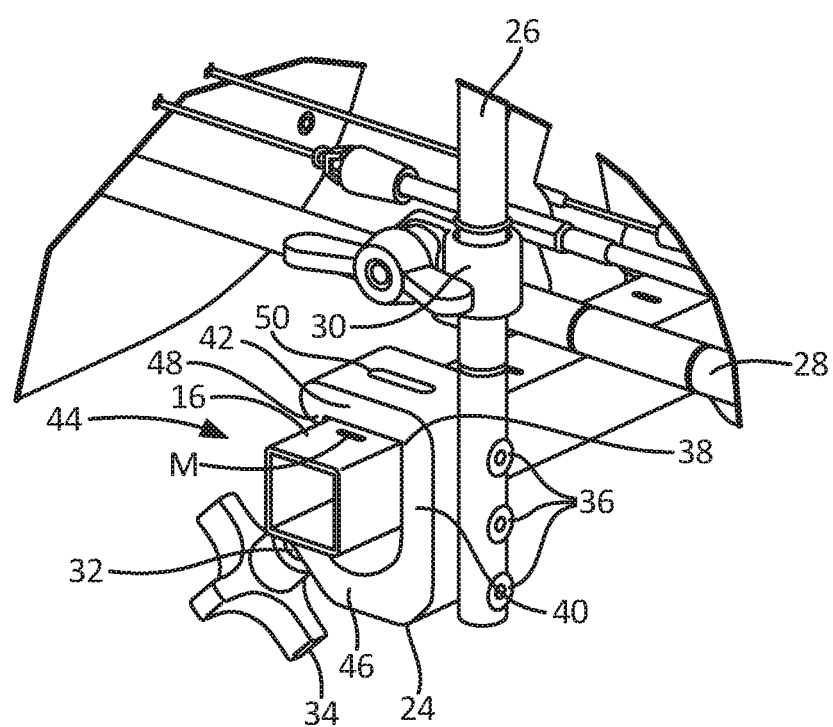
FIG. 3A is a perspective view of a clamp mounted on the mounting arm.
Figure 3B:
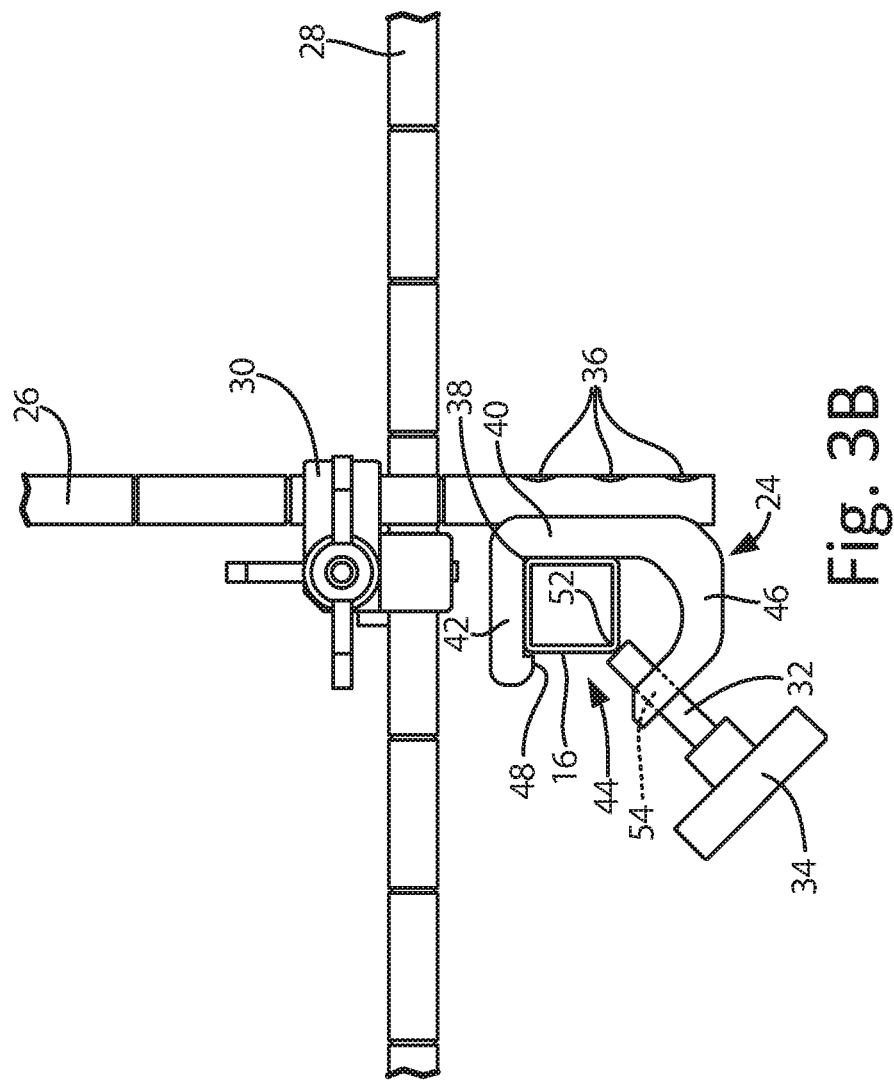
FIG. 3B is a side elevation view of the clamp mounted on the mounting arm.

FIG. 3A is a perspective view of clamp 24 mounted on mounting arm 16, and FIG. 3B is a side elevation view of clamp 24 mounted on mounting arm 16. FIGS. 3A and 3B show mounting arm 16, vertical bar 26, and extension bar 28. Mounting bar 16 includes measurement markings M and corner 52. Vertical bar 26 includes screws 36. Clamp 24 includes fastener 32 with handle 34, first leg 40, second leg 42, third leg 46, corner 38 formed by first leg 40 and second leg 42, opening 44, lip 48, window 50, and hole 54.

Clamp 24 attaches vertical bar 26 to mounting arm 16. Clamp 24 has a generally G-shaped profile with opening 44 through which mounting arm 16 can extend and be secured relative to clamp 24 by fastener 32. While clamp 24 is shown in FIGS. 3A and 3B as having opening 44 facing rearward (i.e., mounting arm 16 can be removed from clamp 24 by moving rearward relative to clamp 24), clamp 24 and the other components of gun assembly 12 can be configured such that opening 44 faces forward. The G-shaped profile of clamp 24 is formed by first let 40, second leg 42, and third leg 46. First leg 40, second leg 42, and third leg 46 can have any thickness, width, and height/length depending on the strength and rigidity needs, the type of material used to construct clamp 24, and the dimensions of mounting arm 16. However, first leg 40, second leg 42, and third leg 46 should have dimensions that are able to accommodate mounting arm 16 within opening 44 so that mounting arm 16 is able to enter and exit opening 44 without the need for clamp 24 to slide onto and off of an end of mounting arm 16. First leg 40, second leg 42, and third leg 46 can each have a constant or varied thickness or width, and the thickness and width of each leg can be the same or different than a thickness and width of the other legs. First leg 40, second leg 42, third leg 46, and lip 48 can be constructed from the same or different materials, can be one continuous and monolithic piece, and/or can be individual pieces welded or otherwise fastened together.

First leg 40 is a vertical component that is adjacent to and connected to vertical bar 26. First leg 40 has an inner side that is adjacent to and in contact with mounting arm 16 when clamp 24 is secured to mounting arm 16. First leg 42 has an outer side that is adjacent to and attached to vertical bar 26. First leg 40 can have one or multiple apertures (shown in FIGS. 4A-4F) with threads that interface with screws 36 of vertical bar 26 to attached vertical bar 26 to first leg 40. Further, first leg 40 can also have one or more grooves on the outer side (shown in FIGS. 4A-4F) to engage vertical bar 26 to help prevent vertical bar 26 from rotating relative to clamp 24. A first end of first leg 40, which is at an upper end of first leg 40, can be rounded, beveled, or chamfered on the outer side, can form a square outer corner with second leg 42, or can have another configuration. A second end of first leg 40, which is at a lower end of first leg 40 and is distal from the first end, can also be rounded, beveled, or chamfered on the outer side or have another configuration.

Second leg 42 is a laterally extending component that is attached to and extends outward from the first end of first leg 40. Second leg 42 has an inner side that is adjacent to and in contact with mounting arm 16 when clamp 24 is secured to mounting arm 16. Second leg 42 includes a first end that is connected to first leg 40 and, along with the first end of first leg 40, creates corner 38. When secured to mounting arm 16, corner 38 of clamp 24 is adjacent to and in contact with mounting arm 16. Other configurations of mounting arm 16 and clamp 24 can include a corner 38 of clamp 24 and an adjacent corner of mounting arm 16 having another shape, such as rounded or stair stepped, that interlock with one another. Second leg 42 has a second end distal from the first end of second leg 42 and from which lip 48 extends. The second end of second leg 42 can be rounded, can be chamfered, can terminate at a point, can have a square end, or can have another configuration. While second leg 42 can have any length (i.e., length in a rearward direction extending outward from first leg 40), the length of second leg 42 should be greater than a width of mounting arm 16 to accommodate mounting arm 16 within opening 44. Second leg 42 is shown in the disclosed embodiment as being perpendicular to first leg 40, but other embodiments of clamp 24 can have a second leg 42 that has different shapes and configurations such that opening 44 is sized and shaped differently. It will be understood that other shapes and configurations of opening 44 (as formed by first leg 40, second leg 42, and third leg 46) is not limited to that shown, and modification and different configurations are within the scope of this disclosure.

Lip 48 is a downward extending member that is attached to and extends from the second end of second leg 42. Lip 48 extends downward into opening 44 and has an inner side (i.e., the side that faces the inner side of first leg 40) that can be in contact with mounting arm 16 when mounting arm 16 is secured within opening 44. Lip 48 aids fastener 32 in securing mounting arm 16 within opening 44 by helping prevent clamp 24 from moving forward when mounting arm 16 is in contact with the inner side of second leg 42. Lip 48 can be sized such that first leg 40, second leg 42, and lip 48 on second leg 42 allow clamp 24 to be mounted on mounting arm 16 by hanging clamp 24 on mounting arm 16 without the need for fastener 32 to extend and engage/contact mounting arm 16. Lip 48 can extend into opening 44 any distance, but should not extend into opening 44 so much that removal of clamp 24 forward from mounting arm 16 is difficult or impossible. Lip 48 can have a rounded, beveled, or chamfered outer profile or another configuration, such as a square outer profile. Further, a distance between the inner side of lip 48 and the inner side of first leg 40 can be approximately equal to or a small amount larger than the width of mounting arm 16 to aid in the prevention of rotation of mounting arm 16 within opening 44 of clamp 24. Other embodiments of clamp 24 can include a configuration that does not have lip 48.

Window 50 is an aperture that extends vertically through second leg 42 to allow a user of line striper 2 to view measurement markings M on mounting arm 16. As described above, measurement markings M indicate distance along mounting arm 16 and aid in the placement of gun assemblies 12 along mounting arm 16 relative to other gun assemblies 12 and to mounting arm 16. Window 50 is configured to allow a user to view measurement markings M to accurately assess the position of clamp 24 on mounting arm 16. Window 50 can be laterally aligned with vertical bar 26, which is attached to first leg 40, to allow a user to match up vertical bar 26 (and the other components of gun assembly 12) with a particular measurement marking 32. Window 50 can have any length, width, and shape that allow measurement markings M to be viewable through window 50. However, window 50 should not be so large as to compromise the structural integrity of second leg 42.

Third leg 46, also referred to as a curved leg, is a curved component that is attached to and extends laterally outward from the second end of first leg 40. Third leg 46 includes a first end that is connected to the second end of first leg 40 and a second end distal from the first end of third leg 46 that includes hole 54 to accommodate fastener 32. The first end of third leg 46 can be rounded, beveled, or chamfered along with the second end of first leg 40 or can have another configuration, such as forming a square outer corner with first leg 40. The second end of third leg 46 can be rounded or have another configuration. While third leg 46 can have any length (i.e., length in a rearward direction), the length of third leg 42 should be greater than a width of mounting arm 16 to accommodate mounting arm 16 within opening 44 and allow the distal end of fastener 32 to extend into opening 44.

Third leg 46 has a curved inner side that is generally not in contact with mounting arm 16 when clamp 24 is secured to mounting arm 16 but may come into contact with mounting arm 16 when clamp 24 is being removed from mounting arm 16. The curved configuration of the inner side of third leg 46 can be advantageous for preventing mounting arm 16 from being caught between corners and/or edge of clamp 24 during removal. Specifically, clamp 24 will slide relative to mounting arm 16 (i.e., mounting arm 16 will slide into our out of opening 44) when mounting arm 16 engages/contacts the curved inner side of third leg 46 whereas clamp 24 may not slide if mounting arm 16 were to instead run into a straight surface or the junction of two straight surfaces at a corner. The curved inner side of third leg 46 can guide clamp 24 off of mounting arm 16 when mounting arm 16 comes into contact with the curved inner side of third leg 46. An outer side of third leg 46 can by curved to correspond to the curved inner side of third leg 46 so that third leg 46 has a constant thickness, or the outer side of third leg 46 can be squared off such that a thickness of third leg 46 is greater near the first end and the second end than a thickness of third leg 46 near a middle. As shown in FIG. 3B, third leg 46 can extend a distance from first leg 40 that is greater than a distance that second leg 42 extends from first leg 40. In other embodiments, third leg 46 can extend a distance from first leg 40 that is equal to or less than a distance that second leg 42 extends from first leg 40.

Hole 54 extends through the second end of third leg 46 to accommodate fastener 32. Hole 54 is shown to extend at an approximately forty-five degree angle to allow fastener 32 to extend towards and contact bottom corner 52 of mounting arm 16 to secure clamp 24 relative to mounting arm 16. However, hole 54 can extend substantially vertical, substantially horizontal, or at another angle to allow fastener 32 to extend into opening 44 to contact mounting arm 16. Hole 54 can have any size and shape to accommodate fastener 32, and hole 54 can be a plurality of holes to accommodate multiple fasteners 30.

Fastener 32 can be a screw, a spring loaded element mounted on clamp 24 that can be retracted by hand, or another type of fastener that is extendable inward through hole 54 into opening 44 to contact mounting arm 16 and can be retracted or loosened to allow clamp 24 to move independent from mounting arm 16. Fastener 32 in the disclosed embodiment has a threaded portion for interfacing with a threaded hole 54 in third leg 46. Fastener 32 as shown screws through hole 54 to press against corner 52 of mounting arm 16 to fix the position of clamp 24 relative to mounting arm 16. While fastener 32 is a screw with threaded hole 54 in the disclosed embodiment, it will be understood that any other fastener can be used to secure clamp 24 to mounting arm 16. Fastener 32 can be tightened to secure clamp 24 to mounting arm 16 by ensuring the inner sides of first leg 40 and second leg 42 are in contact with two sides of mounting arm 16. Fastener 32 pushes on corner 52 of mounting arm 16 such that mounting arm 16 is adjacent to first leg 40 and second leg 42 of clamp 24. Fastener 32 can be configured to contact and push on corner 52 of mounting arm 16 to push mounting arm 16 vertical and forward relative to clamp 24, thereby limiting all degrees of freedom of clamp 24 and mounting arm 16 relative to one another. Because fastener 32 pushes on corner 52 of mounting arm 16, only one fastener is needed to brace clamp 24 from movement in any direction relative to mounting arm 16.

Fastener 32 can extend into opening 44 at any angle, including a vertical angle, a horizontal angle, or an angle that is approximately forty-five degrees (as shown in FIGS. 3A-3B). Fastener 32 can be loosened (i.e., retracted at least partially out of opening 44) so that clamp 24 can disengage from mounting arm 16 (or engage without tension) to allow clamp 24 to slide along mounting arm 16 while clamp 24 is still mounted on mounting arm 16 and/or to allow mounting arm 16 to be removed from opening 44 through a gap between the second end of second leg 42 and the second end of third leg 46. Fastener 32 can also include handle 34, which is attached to an outer end of fastener 32. Handle 34 allows a user to manipulate fastener 32, such as tightening and loosening fastener 32 to extend fastener 32 into opening 44 or retract fastener 32 at least partially out of opening 44.

Screws 36 extend through vertical bar 26 and into corresponding apertures on first leg 40 of clamp 24 to secure vertical bar 26 to clamp 24. Screws 36 extend into apertures on first leg 40, but screws 36 should not extend completely through first leg 40 so as to stick out into opening 44 to interfere with securing clamp 24 to mounting arm 16. Screws 36 can be any fastener to secure vertical bar 26 to clamp 24, including welds, glue, a mechanical interaction, or another fastener or configuration. While the disclosed embodiment shows three screws 36, other configurations can include one, two, or more than three screws.

With clamp 24 having a generally G-shaped profile and opening 44 formed by first leg 40, second leg 42, and third leg 46 having a greater height and width than mounting arm 16, clamp 24 and gun assembly 12 are able to be placed on and entirely removed from mounting arm 16 without having to slide clamp 24 off of an end of mounting arm 16 (and without having to remove other gun assemblies 12 installed on mounting arm 16). The curved inner side of third leg 46 guides clamp 24 when removing clamp 24 from mounting arm 16. Third leg 46 also accommodates fastener 32, which secures mounting arm 16 within opening 44 and prevents clamp 24 from moving relative to mounting arm 16. Fastener 32 and the configuration of clamp 24 limit all degrees of freedom of mounting arm 16, preventing clamp 24 and mounting arm 16 from movement and rotation relative to one another. Clamp 24 can also include lip 26 on second leg 42 to extend downwards into opening 44 to help prevent clamp 24 from moving forward and rotating relative to mounting arm 16 when clamp 24 is secured to mounting arm 16. These advantages and others can be seen through the shape and configuration of clamp 24 in FIGS. 4A-4F.

FIG. 4A is a perspective view of a top side of clamp 24, FIG. 4B is a bottom plan view of clamp 24, FIG. 4C is a perspective view of a bottom side of clamp 24, FIG. 4D is a front elevation view of clamp 24, FIG. 4E is a side elevation view of clamp 24, and FIG. 4F is a rear elevation view of clamp 24. FIGS. 4A-4F will be discussed together. Clamp 24, which is shown without fastener 32, includes first leg 40 with groove 58 and apertures 60, second leg 42 with lip 48 and window 50, third leg 46 with hole 54, and opening 44 formed by first leg 40, second leg 42, and third leg 46. Clamp 24 as disclosed is but one embodiment and various alternative configurations can be embodied while utilizing one or more of the features referenced and/or shown herein.

First leg 40 includes groove 58 on the outer side and apertures 60 that extend through first leg 40. Groove 58 can extend along the total height/length of first leg 40 to accommodate vertical bar 26. Groove 58 is shaped to mirror the shape of vertical bar 26 (in this case, groove 58 has a curved cross-sectional shape to match the rounded outer surface of vertical bar 26). Groove 58 aids in the attachment of clamp 24 to vertical bar 26 by supporting vertical bar 26 laterally to prevent rotation of vertical bar 26 relative to clamp 24. While groove 58 is shown to have a constant cross-sectional shape, groove 58 can have a varying depth and shape to mirror the configuration of vertical bar 26. Apertures 60 extend from groove 58, through first leg 40, and to the inner side of first leg 40 to accommodate screws 36 to connect vertical bar 26 to clamp 24. The number of apertures 60 can correspond to the number of screws 36 used to fasten vertical bar 26 to clamp 24. While the disclosed embodiment utilizes screws 36 and apertures 60 to connect vertical bar 26 to clamp 24, other fasteners having other configurations may be used, such as welding, brazing, gluing, forging, casting, or otherwise fastening the two components together. Additionally, while three screws 36 and three apertures 60 are utilized, one, two, or more than three screws 36 and apertures 60 can be used to fasten clamp 24 and vertical bar 26 together.

As shown in FIG. 4E, the first end of third leg 46 has a greater thickness than the second end of third leg 46. Depending on the material used to construct clamp 24, the weight of gun assembly 12, and other factors, this increase in thickness may be necessary to accommodate additionally stresses on third leg 46.

Clamp 24 for use with line striper 2 is generally G shaped with opening 44 through which mounting arm 16 is able to extend and be secured relative to clamp 24. Mounting arm 16 is able to be removed from opening 44 of clamp 24 such that clamp 24 can be separated from mounting arm 16. Clamp 24 secures components of spray gun assembly 12 (such as vertical bar 26, extension bar 28, spray gun 20, and spray gun holder 22) to mounting arm 16. Clamp 24 includes fastener 32 configured to secure mounting arm 16 within opening 44 to secure spray gun assembly 12 to mounting arm 16 and therefore to frame 5 of line striper 2. Because clamp 24 is generally G shaped, clamp 24 and spray gun assembly 12 can be installed upon and removed from mounting arm 16 without having to slide clamp 24 on and off an end of mounting arm 16. With line striper 2 usually having multiple spray gun assemblies 12 mounted along one mounting arm 16, a configuration that does not utilize the disclosed clamp 24 would result in an outer spray gun assembly 12 having to be removed from mounting arm 16 before installing or removing an inner spray gun assembly 12 from mounting arm 16 because the fastener holding each spray gun assembly 12 on mounting arm 16 is only able to slide onto and off of mounting arm 16.

Clamp 24 can be installed onto and removed from mounting arm 16 without the need to slide clamp 24 and spray gun assembly 12 on and off the end of mounting arm 16. Further, the curved shape of the inner side of third leg 46 of clamp 24 aids in separating of clamp 24 from mounting arm 16 because the curved inner side of third leg 46 can guide clamp 24 off of mounting arm 16 without mounting arm 16 getting caught on a corner of clamp 24. The clamp can include a number of other advantageous features. Clamp 24 can include lip 48 that extends into opening 44 to aid in securing mounting arm 16 from movement or rotation relative to clamp 24. Clamp 24 can include window 50 in second leg 42 through which measurement markings M on mounting arm 16 are viewable to allow a user to orient and line up spray gun assembly 12 and spray gun 20 relative to line striper 2 and to other spray gun assemblies 12. Fastener 32 can be a screw that extends through third leg 46 of clamp 24 with fastener 32 having handle 34 on one end to tighten and loosen fastener 32. Fastener 32 can extend into opening 44 and towards mounting arm 16 at an angle that urges mounting arm 16 into corner 38 between the inner sides of first leg 40 and second leg 42 of clamp 24 such that only one fastener 32 is needed to secure mounting arm 16 within opening 44 along all degrees of freedom. Clamp 24 can contain other features that attach clamp 24 to the other components of spray gun assembly 12, including groove 58 and/or apertures 60 along with screws 36 to attach vertical bar 26 to the back side of first leg 40 of clamp 24.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. As one example, an embodiment relying on an electrical motor is described, but the features discussed herein could also be used with a gas motor and/or hydraulic drive.

The invention claimed is:

1. A method of mounting at least one spray gun assembly onto an arm of a line striper comprising:
    installing a first clamp onto the arm with the first clamp being connected to a first spray gun assembly and the first clamp having an opening formed at least in part by a first leg and a second leg that extends away from the first leg with the first leg and second leg forming a corner, wherein the first clamp is installed onto the arm by placing the arm within the opening of the first clamp by resting the arm on the second leg adjacent to the corner without requiring sliding of the first clamp onto an end of the arm; and
    securing the arm of the line striper within the opening of the first clamp by biasing the arm to be held in contact with the corner, the first leg, and the second leg.

2. The method of claim 1, wherein the arm is secured within the opening of the first clamp using a fastener.

3. The method of claim 1, further comprising:
    placing a spray gun within a gun holder of the first spray gun assembly.

4. The method of claim 1, further comprising:
    removing a spray gun from a gun holder of the first spray gun assembly to allow for manual application of paint.

5. The method of claim 1, wherein the arm is connected to a frame of the line striper.

6. The method of claim 1, further comprising:
    installing a second clamp onto the arm with the second clamp being connected to a second spray gun assembly and the second clamp having an opening, wherein the second clamp is installed onto the arm by placing the arm within the opening of the second clamp without sliding the second clamp onto the end of the arm; and
    securing the arm of the line striper within the opening of the second clamp.

7. The method of claim 1, further comprising:
    activating the spray gun to spray paint.

8. The method of claim 1, wherein the first clamp includes the first leg having an inner side, a first end, and a second end; the second leg extending away from the first leg and having an inner side that forms the corner with the inner side of the first leg, a first end that is connected to the first end of the first leg, and a second end distal from the first end of the second leg; and a third leg extending away from the second end of the first leg and having a first end that is connected to the second end of the first leg and a second end distal from the first end of the third leg, and wherein the step of securing the arm to the line striper further comprises:
    biasing the arm into the corner by using a fastener extendable into the opening from the third leg towards the corner.

9. The method of claim 8, wherein the fastener includes a threaded interface within the first clamp configured to extend towards the corner of the first clamp, and wherein the step of securing the arm to the line striper further comprises:
    screwing the fastener such that the fastener engages the arm within the opening to bias the arm into the corner of the first clamp to securely hold the arm relative to the first clamp.

10. The method of claim 8, wherein the fastener includes a spring-loaded mechanism that snaps towards the corner to bias the arm to contact and be secured to the corner of the first clamp.

11. The method of claim 8, wherein the third leg is curved towards the second leg.

12. The method of claim 8, wherein the fastener extends through the third leg.

13. The method of claim 1, wherein the first clamp is connected to a first vertical bar, the first vertical bar is connected to a first extension bar, and the first extension bar is connectable to a spray gun.

14. The method of claim 13, wherein the second clamp is closer to the end of the arm than the first clamp.

15. The method of claim 1, wherein the first clamp includes a first leg having an inner side, a first end, and a second end and a second leg extending away from the first leg and having an inner side and a lip extending into the opening from the second end of the second leg, and wherein the step of installing the first clamp onto the arm further comprises:
    placing the arm adjacent the second leg of the first clamp such that the first clamp rests on the arm and the arm is at least partially located between the first leg and the lip.

16. The method of claim 15, wherein a distance between the first leg and the lip is substantially equal to a width of the arm.

17. A method of mounting at least one spray gun assembly onto an arm of a line striper comprising:
    installing a first clamp onto the arm with the first clamp being connected to a first spray gun assembly and the first clamp having an opening formed at least partially by a leg and a lip connected to and orthogonal to the leg, wherein the first clamp is installed onto the arm by placing the arm within the opening of the first clamp adjacent the lip without requiring sliding of the first clamp onto an end of the arm; and
    securing the arm of the line striper within the opening of the first clamp.

18. The method of claim 17, wherein the step of securing the arm within the opening further comprises:
    biasing the arm to be held in contact with a corner formed at least partially by the leg.

19. The method of claim 18, wherein the arm is biased into the corner by a fastener extendable into the opening.

20. The method of claim 17, wherein the step of installing the first clamp on the arm without sliding the first clamp onto the end of the arm further comprises:
    raising the first clamp when the arm is being inserted into the opening so that the lip clears the arm; and
    lowering the first clamp onto the arm so that the leg of the first clamp sits on the arm.

* * * * *